United States Patent
Durand

[11] 3,876,224
[45] Apr. 8, 1975

[54] THREE-AXLE VEHICLE

[76] Inventor: Francois Durand, 108 Boulevard Carnot 78, Le Vesinet, Yvelines, France

[22] Filed: Feb. 20, 1974

[21] Appl. No.: 444,241

[30] Foreign Application Priority Data
Feb. 28, 1973 France .................. 73.07238

[52] U.S. Cl. ............ 280/81.5; 280/81 R; 298/17 R; 298/22 R
[51] Int. Cl. ............................... B62d 61/10
[58] Field of Search .......... 280/81 R, 81.5; 180/22, 180/23, 79.2 R, 24.01, 24.02; 298/17 R, 22 R

[56] References Cited
UNITED STATES PATENTS

| | | |
|---|---|---|
| 3,099,460 | 7/1963 | Sheehan .................. 180/23 X |
| 3,397,896 | 8/1968 | Willetts .................. 180/22 X |
| 3,506,079 | 4/1970 | Madler et al. .................. 180/22 |
| 3,507,512 | 4/1970 | McKee et al. .................. 280/81.5 |
| 3,680,653 | 8/1972 | Murata et al. .................. 180/23 |

*Primary Examiner*—Leo Friaglia
*Attorney, Agent, or Firm*—Michael S. Striker

[57] ABSTRACT

A three-axle vehicle having two steerable axles located on either side of a central axle is disclosed. Each steerable axle is respectively associated with an end chassis and pivoted about a vertical axis provided thereon, so as to steer the vehicle. A main chassis is oriented with respect to each end chassis so as to distribute the loading uniformly amongst all three axles. Cooperating sets of pivotable joints and connecting members which interconnect each steerable axle to the central axle, as well as interconnecting the main chassis to all three axles, are also disclosed.

9 Claims, 6 Drawing Figures

3,876,224

THREE-AXLE VEHICLE

BACKGROUND OF THE INVENTION

The present invention relates in general to multiple-axle vehicles and has particular reference to an improved design of three-axle vehicles wherein two steerable axles are disposed on either side of a central axle. These vehicles are special-purpose ones and may be used notably for public works or for transporting heavy loads.

A number of vehicles of this type have already been proposed in the art. However, in these known constructions the load distribution among the six wheels as a function of the ground profiles and unevennesses depends mainly on the flexibility of the suspension elements of the vehicles. Besides, in these prior-art vehicles the necessary pivotal connections between the axles, about the longitudinal center line of the vehicle, are provided by means of horizontal pivot shafts and these are compulsorily heavy and cumbersome.

It is therefore the essential object of the present invention to provide a vehicle of the same general character but so designed that the loads are evenly distributed among the three axles, and wherein the simplest means are used for pivoting the various axles about the longitudinal center line of the vehicle.

To this end, the vehicle according to this invention is based on the combination of the characteristic features listed hereinafter:

a. each steerable axle is pivoted to an end chassis about a vertical axis, at least one of these end chassis may be oriented with respect to the main chassis in order to distribute a more uniform loading among the axles, the two end chassis being adapted to absorb the steering reactions;

b. each end or steerable axle chassis is connected to the central axle by means of a pair of forks disposed one above the other and having different orientations or angular settings;

c. the spaced or spread-apart ends of the lower connecting fork are pivoted, directly or indirectly, to the central axle shaft and the apex of this fork is pivoted by means of a universal joint or ball-and-socket joint to the corresponding end chassis at a point located in the median longitudinal plane of the vehicle, between the central axle and the corresponding end or steerable axle, and at a distance affording an even distribution of loads among these two axles;

d. the spaced ends of the upper connecting fork are secured or pivoted to the corresponding end chassis, and the apex of this fork is pivoted directly or indirectly to the central axle shaft by means of a universal joint or ball-and-socket joint, at a point lying substantially in the median longitudinal plane of the vehicle;

e. the main, load-supporting chassis is supported by a pair of substantially vertical supporting bars having their upper ends pivoted to said main chassis and their lower ends supported by the relevant apices of the lower connecting forks, respectively.

When it is deemed necessary to avoid vertical dynamic effects, the pair of supporting bars carrying the main chassis may consist of elastic rams, in order to constitute an elastic load suspension.

According to another feature characterising the vehicle of this invention, a stabilizing frame structure is provided on one side only of the central axle for connecting this central axle to the main load carrying chassis, said stabilizing frame being pivoted at one end to the central axle shaft and at the other end about an upper horizontal axis parallel to said central axle shaft and substantially coincident with the axis of the pivotal connection between the corresponding supporting bar pivoted to the main chassis.

With the arrangement according to this invention, the three axles of the vehicle are pivotally interconnected, but the pivotal and connecting means provided to this end are so designed and disposed that the loads carried by the main chassis are evenly distributed among the six wheels of the vehicle, this distribution being substantially independent of the load suspension means.

Besides, the relative pivotal movements of the axles about the longitudinal center line of the vehicle are obtained by using simple ball-and-socket or universal joints, the imaginary axis interconnecting these joints constituting the pivot axis of one axle in relation to the other two.

Due to the provision of the above-mentioned stabilizing frame the load carried by the vehicle assumes the same lateral inclination as the central axle. However, other means may be contemplated for stabilizing the load both laterally and longitudinally, so that it can follow the lateral inclination of one of the steerable end axles of the vehicle.

Other features and advantages characterising the vehicle according to this invention will appear as the following description proceeds with reference to specific forms of embodiment thereof given by way of example and illustrated diagrammatically in the attached drawings, in which.

Figure 1:
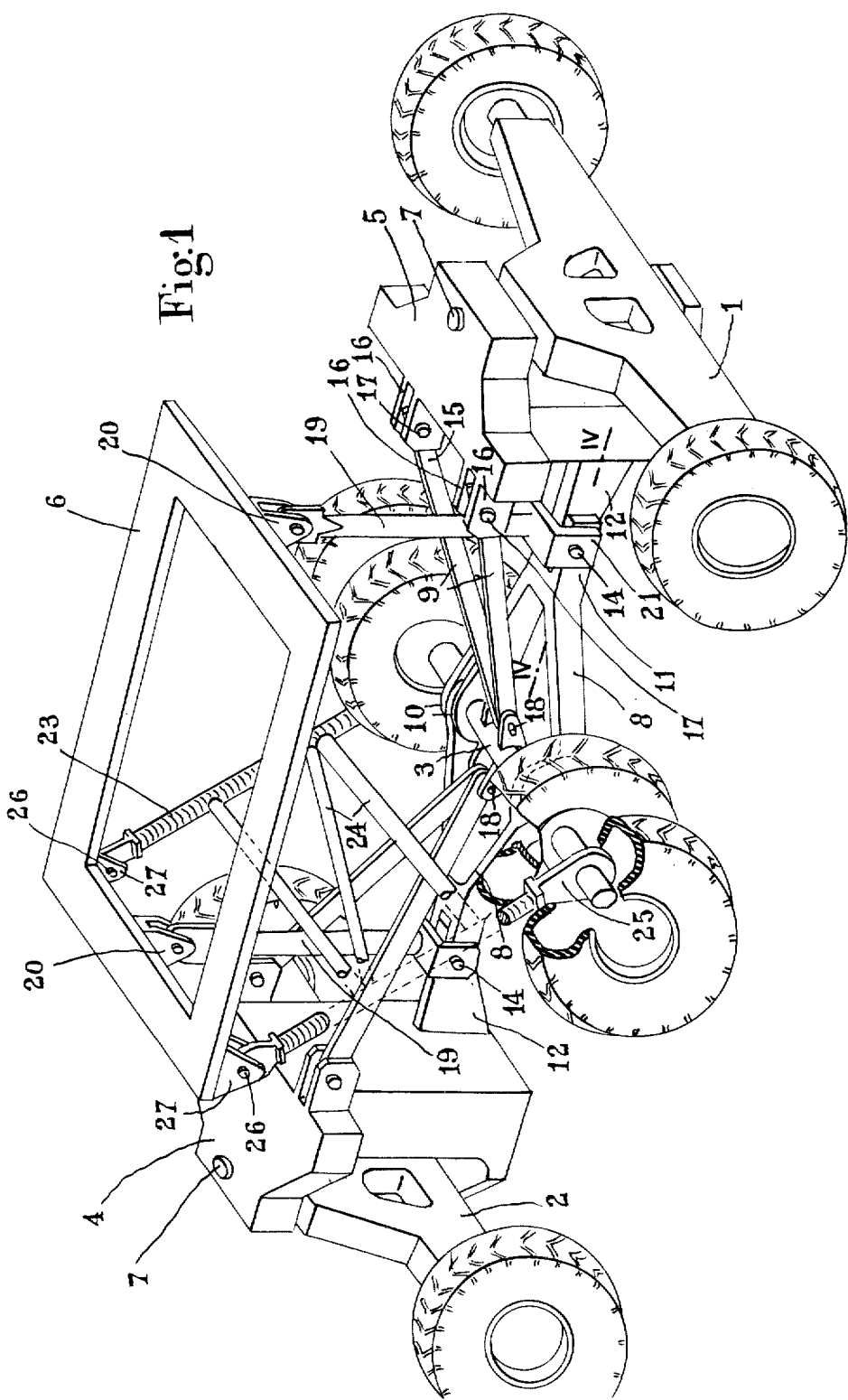
FIG. 1 is a perspective view of a first embodiment of the vehicle of this invention.

In the form of embodiment illustrated in FIG. 1, the three-axle vehicle according to this invention comprises two steerable axles 1 and 2 disposed on either side of a central, non-steerable axle 3. These steerable axles 1, 2 are pivotally mounted in two end chassis 4 and 5 independent of the main chassis 6 adapted to carry the load to be transported by the vehicle. To this end, the end steerable axles 1, 2 are pivoted to vertical pivot pins 7 carried by these end chassis 4, 5, respectively; the steering of these end axles 1, 2 may be controlled through any suitable and known means, for example by means of hydraulic cylinder-and-piston units reacting between the steerable axles 1, 2 and the end chassis 4, 5 respectively.

Each end chassis 4, 5 is connected to the central axle shaft 3 by means of a pair of forks 8, 9 disposed above each other and inclined in opposite directions.

Figure 4:
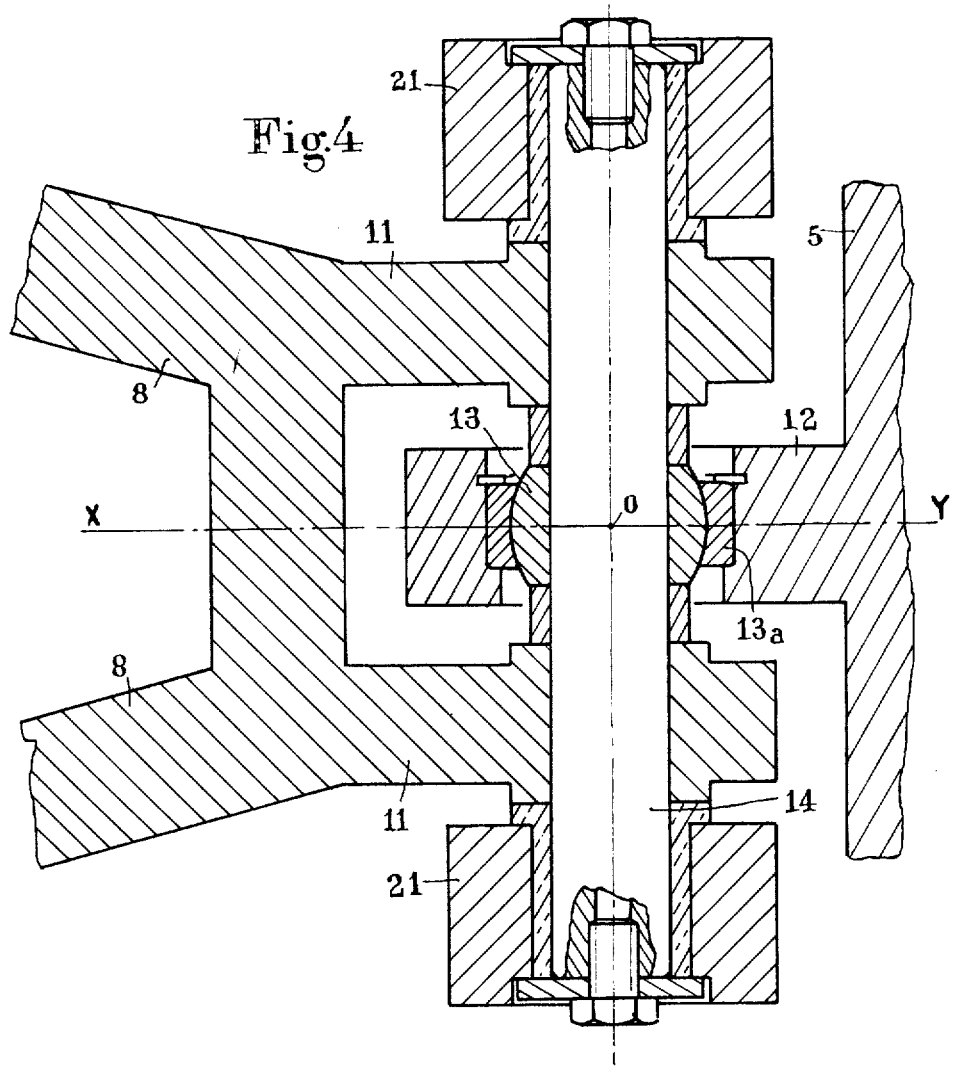
FIG. 4 is a fragmentary section taken on a larger scale along the line IV—IV of FIG. 1.

The spaced or spread apart legs 10 of the pair of lower forks 8 provided on either side of the central axle shaft have their ends rotatably mounted on this axle shaft. The apex of each fork 8 comprises a yoke 11 pivoted to the inner end of an arm 12 rigidly carried by the inner face of the corresponding end chassis 4 or 5. This pivotal mounting comprises a ball-and-socket joint 13 secured to a pivot pin 14 interconnecting the two arms of yoke 11 and movable in a bearing 13a secured in a suitable opening of said arm 12 (see FIG. 4).

It should be noted that the center O of this ball-and-socket joint lies in the longitudinal median plane of the vehicle. Besides, this center O is located between the central axle shaft 3 and the corresponding steerable axle 1 or 2, at a suitable distance ensuring an even distribution of the loads among these axles.

The spaced ends 15 of the pair of upper connecting forks 9 are pivoted to the upper portions of the corresponding end chassis 4 and 5, respectively. To this end, the inner face of each end chassis 4, 5 carries a pair of straps 16 each engaged by one end 15 of the upper connecting fork 9 which is pivoted therein by means of a corresponding horizontal pivot pin 17.

Besides, the pair of upper connecting forks 9 have their apices pivotally connected to the central axle shaft 3. To this end, this central axle shaft 3 comprises on either side a pair of straps engaged by the narrow end portions of these forks in which they are pivoted by means of a corresponding pair of ball-and-socket joints each carried by a pivot pin 18. These ball-and-socket joints will thus lie in the longitudinal median plane of the vehicle.

It should be noted that the imaginary axial line interconnecting the ball-and-socket joints 13 and 18 of the apices of the two superposed connecting forks disposed on a same side is coincident with the pivot axis of an end chassis 4 or 5 in relation to the central axle shaft 3.

The main chassis 6 supporting the load bears on a pair of substantially vertical supporting bars 19 disposed in the median longitudinal plane of the vehicle, as shown. The upper end of each bar 19 is pivotally connected to a strap 20 rigidly carried by the underface of the main chassis 6. The lower ends of these bars 19 carry in turn corresponding straps 21 pivotally connected to the apices of the lower connecting forks 8, respectively, as shown. This pivotal connection is obtained by means of a pivot pin 14 extending through the corresponding ball-and-socket joint 13 (see FIG. 4).

In the form of embodiment illustrated in FIG. 1 the vehicle comprises a stabilizing frame comprising a pair of parallel arms 23 interconnected by bracing members 24. These arms 23 are disposed on either side of the vehicle and bear with their lower ends on the central axle shaft 3 by means of bearings 25. The upper ends of these arms 23 are pivoted to pivot pins 26 inside straps 27 provided to this end at one end of the main frame 6.

The purpose of this stabilizing frame is to constantly keep the main chassis 6 in the same lateral inclination conditions as the central axle 3.

As already explained in the foregoing, the original design of the three-axle vehicle according to this invention is advantageous in that the axles are allowed to oscillate independently of one another while affording an even distribution of the loads without resorting to the elastic component elements of the suspension system for this purpose. Therefore, this even distribution of loads is obtained irrespective of the ground unevennesses.

The elastic load suspension may be obtained by providing elastic rams or cylinder-and-piston units for constituting the vertical supporting bars 19 at both ends of the main chassis 6.

Figure 2:
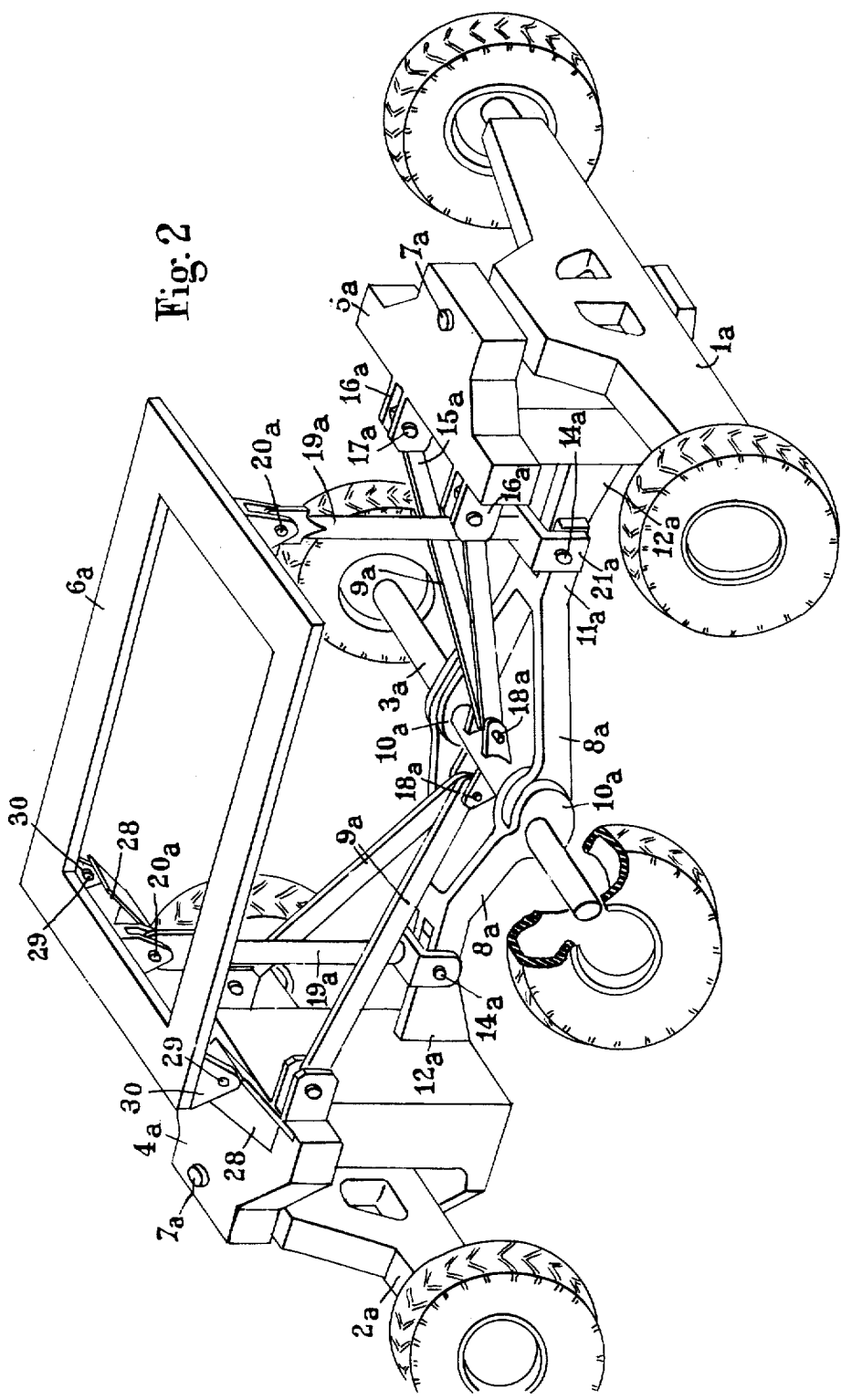
FIGS. 2 and 3 are perspective views showing two modified embodiments of this vehicle.

In the modified form of embodiment illustrated in FIG. 2 the vehicle construction is based on the same general principles as the vehicle shown in FIG. 1; therefore, identical or corresponding parts are designated by the same reference numerals but these bear the exponent letter a.

However, in this example other connecting means are substituted for the stabilizing frame 23 of the preceding embodiment for constantly maintaining the main chassis 6a supporting the vehicle load in the same lateral inclination as one of the steerable axles, namely the axle 2a.

To this end, the corresponding end chassis 4a carries at its upper portion a pair of brackets 28 rigid therewith which are pivoted to a pair of horizontal pivot pins 29 in corresponding straps 30 underlying the corresponding end or cross-member of chassis 6a.

In this respect it may be noted that the two pivot pins 29 are substantially aligned with the pivot pin 20a by which the supporting bar 19a is pivotally connected to the corresponding end of chassis 6a.

The pair of straps 30 are spaced as far as possible from each other so that the main chassis 6a follows the changes in cant of the steerable axle 2a. In this case, only the supporting bar 19a disposed under the opposite end of the main chassis can be constructed as an elastic cylinder-and-piston unit acting as a suspension device for the load transported by the vehicle.

Figure 3:
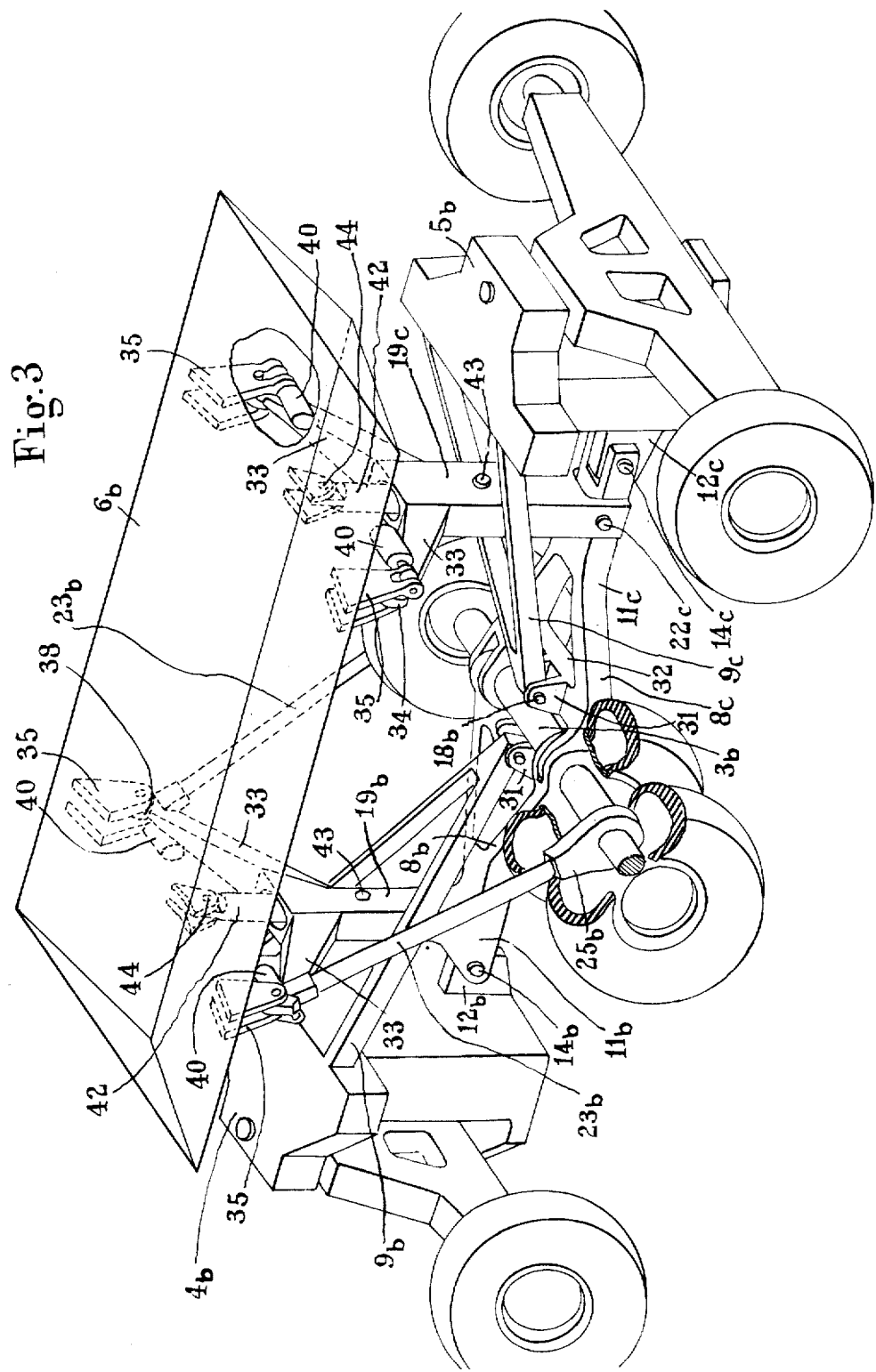

In the alternate form of embodiment illustrated in FIG. 3 of the drawings the corresponding vehicle has the same general arrangement as in FIG. 1, and the corresponding component elements are designated by the same reference numerals bearing the exponent b.

However, this vehicle departs from the preceding ones by a number of points.

Thus, the spread-apart ends of the upper connecting forks 9b provided on either side are rigid with the corresponding end chassis 4b and 5b, instead of being pivoted thereto. On the other hand, the apices of these forks 9b are not pivoted directly to the central axle shaft 3b. In fact, each upper fork 9b, is pivoted at its small end about a pivot pin 18b carried by a strap 31 carried in turn by a cross member 32 rigid with the arms of the corresponding lower connecting fork 8b. However, these pivotal connections are still located in the median longitudinal plane of the vehicle and very close to the central axle shaft 3b.

Another modification resides in the substitution of a pair of relatively heavy posts 19b, 19c for the vertical supporting bars 19 of FIG. 1. At its lower end, the post 19b is rigid with the corresponding lower fork 8b and with the top portion 11b thereof which is pivoted through a pivot pin 14b to an arm 12b rigid in turn with the corresponding end chassis 4b.

At its upper end this post 19b carries a pair of integral lateral arms 33 having pivoted to their outer ends the main chassis 6b by means of ball-and-socket joints 34. To this end, the lower face of this main chassis 6b carries a pair of straps 35 registering with said joints and having fitted therein corresponding pivot pins 36 engaging the corresponding joints 34.

Figure 5:
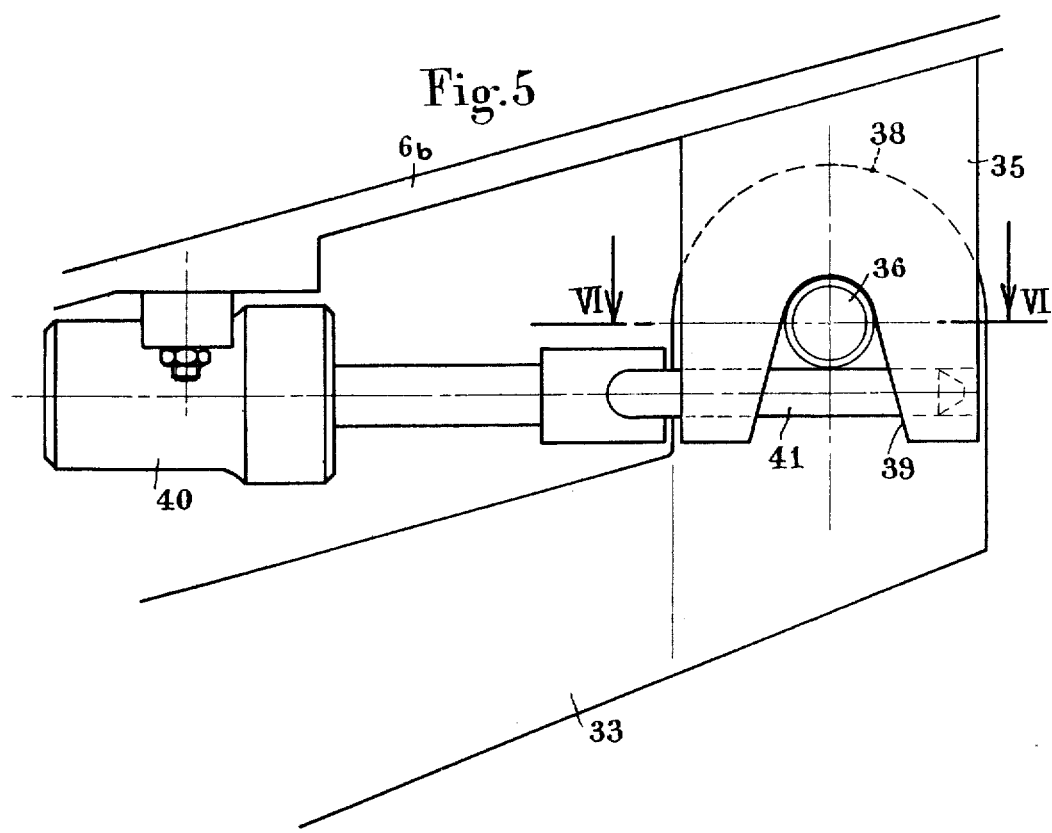
FIG. 5 is a fragmentary elevational view of a detail of the embodiment of FIG. 3.
Figure 6:
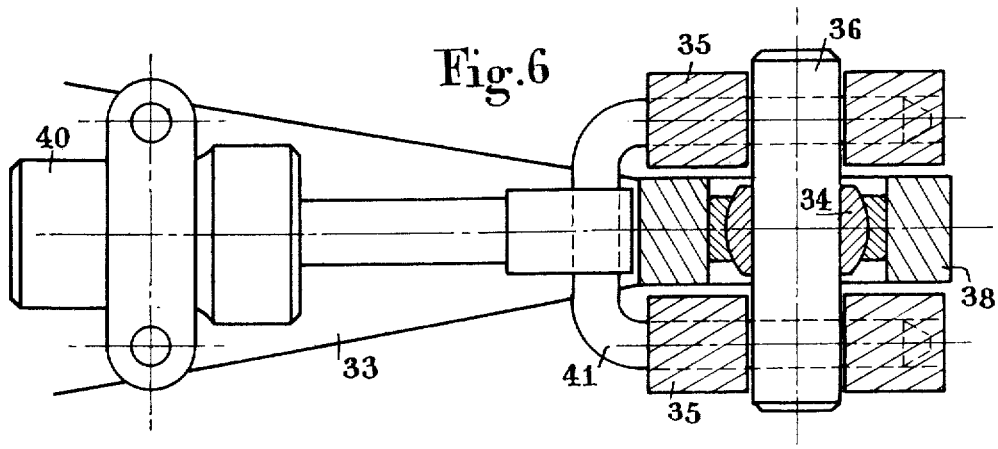
FIG. 6 is a section taken along the line VI—VI of FIG. 5.

The ball element 34 is movable in a concave bearing 37 carried by a vertical fork 38 formed integrally with the outer end of the corresponding arm 33 (see FIGS. 5 and 6). The trunnion-forming ends of pivot pin 36 are movable with a certain play in notches 39 formed in the side members of strap 35.

The post 19c provided at the opposite end comprises like post 19b a pair of integral rigid arms 33, at its upper end, for supporting by means of ball-and-socket joints 34 the relevant end of the main chassis. Preferably, each joint 34 comprise locking means responsive to a fluid-actuated cylinder 40 secured under said main frame 6b. The piston rod of this cylinder 40 carries a locking fork 41 of which the horizontal prongs are adapted to engage passages formed in the side members of the corresponding strap, underneath the pivot pin 36.

The lower end of the other post 19c is pivoted as in the preceding case to the top of the lower corresponding connecting fork 8c. However, this pivotal mounting is not located just plumb to the one provided at the top of the same fork on the corresponding end chassis 5b. In fact, the pivot pin 22c connecting the lower end of post 19c to the top 11c of fork 8c is somewhat off-set in relation to the axis of pivot shaft 14c of the ball-and-socket joint connecting this fork end to the arm 12c carried by the corresponding end chassis 5b. Thus, the pivot pin 22c is located between the central axle shaft 3b and the axis of ball 13c.

The stabilizing frame 23 provided in the embodiment of FIG. 1 is replaced by a pair of side bars 23b having their lower ends 25b pivotally mounted to the corresponding ends of the central axle shaft 3b. The upper ends of these bars 23b are rigid with the ends of the pair of arms 33 carried by the upper end of post 19b.

Besides, a pair of lifting jacks 42 are provided at the top of each supporting posts 19b and 19c. These jacks 42 partially engage the relevant posts 19b, 19c with a certain clearance, their lower ends being pivoted within these posts about a cross pin 43.

At their upper ends, these jacks 42 carry a ball-and-socket joint 44 engaging a strap rigid with the lower face of the main chassis 6b. Thus, by actuating these jacks 42 it is possible to tilt the chassis 6b about the pins 36 on one or the other side, as necessary.

Of course, many modifications and variations may be brought to the specific forms of embodiment shown and described herein without departing from the basic principles of the invention as set forth in the appended claims, as will readily occur to those coversant with the art.

What I claim is:

1. Three-axle vehicle comprising a main chassis, two end auxiliary chassis, of which at least one is independent of said main chassis, a central non-steerable axle, two steerable axles provided on either side of said central axle, and pivotally mounted to an end chassis, a pair of forks disposed one above the other with opposite inclinations and operatively connecting each end chassis to said main chassis, the spread-apart ends of each lower connecting fork being rotatably mounted about the central axle and the apex of said lower fork being pivoted by means of a universal joint to the corresponding end chassis at a point located in the median longitudinal plane of the vehicle and between said central axle and the corresponding steerable axle, at a suitable distance for evenly distributing the loads among these two axles; while the spread-apart ends of each upper connecting fork are connected to the corresponding end chassis, and the apex of said fork is pivoted to said central axle by means of a universal joint at a point lying substantially in the median longitudinal plane of the vehicle; a pair of substantially vertical bars supporting said main chassis, said bars being disposed in the median longitudinal plane of the vehicle and having their upper ends pivotally connected to said main chassis and their lower ends adapted to bear on the apex of each lower connecting fork.

2. Three-axle vehicle according to claim 1, in which, at their lower ends, said vertical bars supporting the main chassis carrying the vehicle load are pivoted to the apex of the lower connecting fork on the corresponding side.

3. Three-axle vehicle according to claim 1, in which one of said supporting bars has its lower portion rigidly connected to the apex of the corresponding lower connecting fork.

4. Three-axle vehicle according to claim 1, in which said pair of vertical bearing bars are constructed in the form of elastic jacks to constitute an elastic suspension system for the load-supporting main chassis.

5. Three-axle vehicle according to claim 1, in which on one side only, in relation to the central axle said central axle is connected to the main chassis supporting the vehicle load by means of a stabilizing frame having the maximum rigidity and width, the ends of the sides of said stabilizing frame being pivoted to said central axle on the one hand and about a pivot pin parallel to the central axle and passing substantially through the centre of the upper pivot pin of the corresponding bearing bar, on the other hand.

6. Three-axle vehicle according to claim 1, in which one of the end chassis has bracket-like lateral extensions disposed as far as possible from and on either side of, the longitudinal center line of the vehicle, said main chassis being pivoted to the upper ends of these brackets by means of pivot pins disposed at the maximum permissible distance from said center line of the main chassis and disposed in a plane parallel to said central axle which contains likewise said central bearing bar on the corresponding side, the imaginary line interconnecting the axes of the upper pivot pins of said bearing bar and said stabilizing pivot pins being substantially parallel to said central axle.

7. Three-axle vehicle according to claim 1, in which the upper end of each supporting bar comprises two arms extending on either side thereof and having pivoted to their outer ends strap means rigid with said main chassis by means of pivot pins, each associated with suitable locking means adapted to lock each pivotal connection.

8. Three-axle vehicle according to claim 7, in which a lifting jack is interposed between the upper end of each supporting bar and the main chassis.

9. Three-axle vehicle according to claim 7, in which in the locking means associated with each pivot pins comprise a fluid-actuated cylinder and piston unit adapted to lock the corresponding pivot pin.

* * * * *